July 31, 1962

R. A. WILKINS 3,046,652

METHODS OF AND APPARATUS AND MATERIALS
FOR MAKING STRIP MATERIAL

Filed March 8, 1956

Inventor:
Richard A. Wilkins,
by Emery Booth Townsend Miller + Weidner Attorneys United States Patent Office 3,046,652
Patented July 31, 1962

3,046,652
METHODS OF AND APPARATUS AND MATERIALS FOR MAKING STRIP MATERIAL
Richard A. Wilkins, Rome, N.Y., assignor to Revere Copper and Brass Incorporated, Rome, N.Y., a corporation of Maryland
Filed Mar. 8, 1956, Ser. No. 570,372
12 Claims. (Cl. 29—528)

My invention pertains to metal strip, by which term where the context permits are included sheets and plates, having between its opposite faces one or more slits extending longitudinally thereof capable of, among other things, being expanded by introduction thereinto of pressure fluid to form fluid conducting passages.

The present invention relates to improvements in the methods of and apparatus and materials for making metal strip disclosed by my copending application Serial Number 518,768, filed June 29, 1955, which application and the present application are continuations-in-part of my copending application Serial Number 493,169, filed March 9, 1955, now abandoned.

In the practice of the present invention and that disclosed by my above mentioned copending application Serial Number 518,768 a billet is formed of metal cast about one or more pulverizable elongated members, and without removing said members from the billet the latter is rolled to decrease its thickness and elongate it in the directions of the lengths of said members for forming a strip or the like and for crushing said members to weld preventing powder and for moving toward each other opposite sides of the spaces occupied by said members to produce the slits, and for extending such powder along said spaces and slits as the billet is being elongated.

According to the disclosure of said copending application Serial Number 518,768 the elongated members may be in the form of rods, strips, or tubes, of massive material, for example graphite or soapstone. Such elongated members when formed of these materials in massive form are fragile due to their small cross-sectional areas, resulting in their being liable to break when installing them in the casting apparatus and during the casting operation, thus making their employment difficult and expensive.

Furthermore, graphite has the objection that it cannot be satisfactorily employed in many instances with zinciferous and aluminous metals, and sometimes even with copper and brass, because of lack of compatibility with such metals by reason of the residual graphite powder in the slits being anodic to such metals and therefore having a strong tendency, when the slits are expanded to form conduits and those conduits conduct certain classes of fluids, electrochemically or otherwise to corrode the metal. Furthermore, graphite is not wholly compatible in respect to ferrous and nickeliferous metals by reason of its tending to dissolve into the molten metal during the casting operation and when the billet is heated to a hot rolling temperature.

Soapstone, on the other hand, because of its tendency to lose its water of crystallization and for that reason tending to become unsatisfactorily hard at the pouring temperatures of many metals, is not compatible with, and cannot ordinarily successfully be used with, metals having a higher pouring temperature than that of aluminum, therefore confining its use in a practical sense to the strip formed of zinc and aluminum and metals of comparable and lower pouring temperatures.

Still further, in respect to soapstone, slabs of that material large enough to be employed for cutting from them the pulverizable elongated members in continuous lengths cannot always be obtained from the soapstone quarries. Applicant's above application Serial Number 518,768 seeks to avoid this difficulty by fabricating the elongated soapstone members of small pieces strung on metal wires or the like, which wires are removed from such members preparatory to rolling the billet. Making the members of small pieces and stringing them on wires involves so much machining of the pieces of soapstone, and labor costs involved in assembling them and installing them in the casting apparatus, that such members and the casting operation commonly become unduly inconvenient and expensive.

As pointed out in the above copending application Serial Number 518,768, the above undesirable defects and objections to the elongated members made of graphite and soapstone may be avoided by forming said members of powdered materials, such as magnesia, which are chemically and electrochemically inert with respect to the metals and stable at the pouring temperatures of the metals, mixed with concrete or calcium aluminate and water to form a pastry or fluid mass that may be molded, dried and baked to form slabs from which the elongated members may be cut, or said members molded directly from such mass. However, such members are expensive to produce and, like the graphite and soapstone members, are fragile and therefore difficult and expensive to handle and employ.

Applicant has discovered that the defects of the above mentioned pulverizable elongated members may be avoided by employing members which are composed essentially of fine inherently flexible fibers of fused material that in the form of such fibers will crush to a fine weld preventing powder when the billet containing the members is subjected to the rolling operation. In general, any fused material of this character may be employed for the fibers so long as it and the particular metal being cast are satisfactorily mutually compatible at the pouring temperature of that metal and when the metal has solidified.

In the above respects the elongated members made of these fibers differ from those made of graphite, which substance at the pouring temperatures of ferrous and nickeliferous metals tends, as hereinbefore pointed out, to dissolve into them, and differ from those made of soapstone which, as hereinbefore pointed out, at the pouring temperatures above that of aluminum are not stable because at such temperatures they lose water of crystallization resulting in their becoming so hard that they will not always satisfactorily crush to a powder. Further, the elongated members made of the fibers electrochemically differ from those made of graphite when employed with aluminum because residual amounts of the graphite in the slits tend, when the slits are inflated and conduct many fluid substances, to corrode the metal by electrochemical action.

As used herein by "pouring temperature" is meant the temperature at which the metal is poured to cast it. That temperature is commercial practice is ordinarily from 50 to 250° F. above the liquidus temperature of the metal. Metals suitable for forming the strip include zinc and zinc-base alloys; aluminum, and aluminum-base alloys such as duralumin; copper, and copper-base alloys such as various brasses, various bronzes, nickel-silver and cupronickel; nickel, and nickel-base alloys such as Monel metal; and ferrous metals, such as carbon steel and stainless steel.

Fibers, having the above described characteristics, now commercially available are of the group consisting of heat refractory glass, fused quartz, and fused aluminum silicate. Fibers of other vitreous fused materials, such as alumina ($Al_2O_3$), magnesia (MgO) and various known miscible mixtures of these or either of them with various metal oxides such as titanium oxide ($TiO_2$), could be employed, as the action of the fibers in respect to the present invention is substantially wholly mechanical.

The heat refractory glass may be the well known "electrical" or "E" glass commonly employed in fiber form for producing yarns from which are braided tubes or so-called "stockings" for insulation purposes. Such glass is substantially a chemical combination of about 54% silica with oxides of various other metals.

The fibers of fused aluminum silicate are mutually compatible with all the metals mentioned because they do not unsatisfactorily soften or agglomerate into a hard substance at the pouring temperatures of such metals, do not tend deleteriously to dissolve into the metals at such temperatures, and are chemically inert with respect to those metals in both their molten and solid forms.

The fibers of fused quartz, however, are not always satisfactorily mutually compatible with ferrous and nickel-liferous metals because at the pouring temperatures of such metals (commonly about 2400° F.) such fibers tend somewhat to soften and sometimes to dissolve into the metals. Therefore, although such fibers are to an extent usable with such metals, they are preferably employed only with metals, such as copper, brass, aluminum and zinc, having lower pouring temperatures.

The glass fibers tend somewhat to soften at the ordinary pouring temperature of aluminum (about 1250° F.) and therefore, although usable with that metal, are preferably employed only with metals, such as zinc, having lower pouring temperatures.

The fibers of all the other materials mentioned are in each instance mutually compatible with all the metals mentioned.

Having the material of the fibers of fine gauge causes them to crush directly to a fine powder. This is distinguished from the action which would take place, for example, with massive glass members which would crush first to large particle sizes before they could be reduced to a fine powder, and such particles would form pits in the metal which would fill with the subsequently formed fine powder and thus could not be removed by the rolling operation. The action of all the other materials mentioned when in massive form is substantially the same as that of glass in these respects.

These fine gauge fibers now commercially available have diameters which ordinarily average about 0.75 microns (0.00003 inch). The diameters of the fibers however are in no way critical, and fibers of any diameter of any of the materials mentioned may be employed so long as the diameter is small enough to make the fibers flexible enough to be formed into yarns or threads, or to be matted or felted into a paper product, as desired.

The forms in which the fibers may be employed in the practice of the invention include:

(a) yarns woven to produce flexible textile tapes constituting the elongated members about which the metal is cast, (b) yarns woven to produce flexible textile sheets which may be slit to form strips constituting the elongated members, (c) yarns braided to produce flexible textile tubes or "stockings" which when flat bring opposite sides thereof together and form tape-like strips constituting the elongated members, (d) yarns braided about yarns of the fibrous material to produce round flexible cords constituting the elongated members, (e) the fibers matted or felted, in accordance with common paper mill practice in the same way that vegetable fibers are formed into paper products, to produce paper sheets, or to produce paper in the form of "cardboard" sheets, or to produce the compacted sheet paper product known as "pressed-board"; and these sheets may be slit to form strips constituting the elongated members, (f) yarns braided about flat strips of the flexible paper product or about the woven material to form flat thicker flexible tape-like strips constituting the elongated members, (g) two or more of the woven, braided, or flexible paper product strips superimposed and sewed together at their edges with threads of the fibrous material to produce thicker tape-like flexible strips constituting the elongated members, (h) braided tubes partially filled with fibers, or with powdered material of which the fibers are made, or with other powdered material such as talc, magnesia, alumina, Bentonite, mica, and other inorganics hereinafter mentioned as suitable for loading the paper made of the fibers, and the tubes so partially filled passed between sizing rolls to size and compact them thus to produce strips constituting the elongated members, (i) braided tubes made of yarns of the fibers, in which tubes are inserted one or more textile strips made of yarns or threads of the fibers or strips of the above described paper products made of the fibers, thus to produce flat strips of desired thickness constituting the elongated members, (j) braided tubes made of yarns of the fibers, in which tubes are inserted long lengths or short abutting lengths of massive strips or rods of material that, like such tubes, will crush to a suitable weld preventing powder when the billet is rolled, such material being, for example, soapstone, graphite, and the molded strips and rods described in applicant's above application Serial Number 518,768, it making no difference if the long strips or rods break when in the braided tubes into smaller lengths, and (k) sheets of the flexible paper product in which the fibers are matted or felted about spaced parallel reinforcing yarns or threads of the fibers extending in the directions of the lengths of the strips slit from such sheets, or about open-mesh screen-like reinforcing webs made of such yarns or threads, from which sheets having such webs may be slit strips constituting the elongated members.

The paper and cardboard mentioned above may or may not contain a loading material. Without any loading material such paper and cardboard are flexible to the point of being flaccid. As amounts of loading material are added the paper and cardboard become progressively stiffer and harder as such amounts are increased until strips constituting the elongated members slit from them have sufficient stiffness to render long lengths of them positioned vertically to support their own weight without bowing if they are laterally supported to prevent such bowing.

The paper product in the form of pressed-board, which while being fabricated at the paper mill is subjected to heat and pressure for compacting it, contains loading material for rendering it stiff and hard so that the elongated members formed of it, unless in quite long lengths relative to their cross-sectional areas, ordinarily will need no lateral support to prevent them from bowing.

Except for the purpose of increasing the stiffness and hardness of the above mentioned paper products when it is desired to secure such stiffness and hardness, the loading material is employed for improving the smoothness of their exterior surfaces and for assisting in holding the fibers together.

In casting the molten metal about the elongated members according to the invention, such members are preferably positioned vertically to prevent their buoyancy in the molten metal from bowing them. When the members are flexible enough to require it they are also placed under longitudinal tension to hold them straight when casting the metal about them.

The loading materials employed for the paper products may be any inorganic powder so long as it and the particular metal being cast are satisfactorily mutually compatible in the same sense that that metal and the fibers are satisfactorily mutually compatible. Among these are loading materials commonly employed in paper manufacture employing vegetable fibers. The most important of these for making the elongated members according to the present invention and in respect to their availability and inexpensiveness are powdered magnesia, powdered alumina, talc powder, and powdered Bentonite.

Magnesia and alumina are stable and inert in the respects mentioned when employed with any of the metals mentioned.

Talc powder, like soapstone, tends to lose its water of crystallization and to agglomerate into an unduly hard substance at pouring temperatures above that of aluminum, and therefore it and such metals are not always satisfactorily mutually compatible and it is not employed with the metals of higher melting point than that of aluminum if the effects of the loss of such water of crystallization and of the hardening of the talc are deemed objectionable in respect to the use to which those metals are to be put.

Bentonite, otherwise known as Wyoming Mud, is a naturally occurring clay-like phyllitic mineral of a silica-magnesium composition, or of a silico-alumino-magnesian composition. Such mineral may be readily powdered to form a loading material which and any of the metals mentioned are satisfactorily mutually compatible.

Powdered mullite and powdered silica also may be employed for the loading material.

The mullite and all the metals mentioned are satisfactorily mutually compatible, such loading material being stable at the pouring temperatures of all such metals and inert with respect to them in their molten and solidified conditions.

The powdered silica is sometimes lacking in satisfactory compatibility with ferrous and nickeliferous metals in that it tends somewhat to dissolve into such metals at their pouring temperatures and render them somewhat more difficult to cold work. Although usable with such metals it is preferably not employed where such decrease in the cold workability of the metal is deemed objectionable.

There may likewise be employed for the loading material powdered mica and other powdered pyrophillitic minerals such as steargilite, montmorillonite, confolensite, cimolite, pagotite and agulomalolite, which contain silica, alumina and water chemically combined in the average proportion of 66.5% $SiO_2$, 28.5% $Al_2O_3$, and 4.9% $H_2O$.

Powdered mica behaves like talc powder in the respects above mentioned in connection with talc powder, and is therefore preferably employed only with aluminum and metals having about the same or lower pouring temperatures.

Small amounts of colloidal silica (waterglass) may be employed with the loading materials as a binder, and likewise for the same purpose small amounts of calcium aluminate. When the elongated members prior to casting the metal about them are baked for driving off any moisture and occluded air which they may contain the colloidal silica tends to lose its water of crystallization and be reduced to finely divided silica. Such silica, like the powdered silica above mentioned, tends to dissolve in ferrous and nickeliferous metals, and therefore colloidal silica is preferably not employed in large amounts where the above mentioned effects of such solution is deemed objectionable.

As an example of a loaded paper made of the fibers which applicant has successively employed with aluminum is one produced from a mixture of water with, by weight, 50% quartz fibers, 25% powdered Bentonite, and 25% powdered magnesia, this paper being somewhat flexible. As examples of "pressed-board" applicant has successfully employed with aluminum elonated members of pressed-board produced from a similar mixture of aluminum silicate fibers with 10% talc powder, with 20% talc powder, with 10% powdered Bentonite, with 5% powdered Bentonite and 5% talc powder, and with 10% powdered Bentonite and 10% talc powder, in each instance these percentages being based on the volume of such components when dry and prior to their being mixed with the water. In these examples of pressed-board, quartz fibers may be substituted for the aluminum silicate fibers, and vice versa. Also these compositions may be employed with aluminum when the glass fibers are substituted for the aluminum silicate fibers and quartz fibers if the tendency of the glass fibers to soften at the pouring temperature of aluminum is not deemed objectionable in respect to the resulting aluminum strip produced.

With copper and brass and metals having about the same pouring temperature (about 2200° F.) the same compositions containing fibers of fused aluminum silicate mentioned above as found satisfactory for use with aluminum may be employed if for the talc is substituted other loading material, such as magnesia or Bentonite, stable at such temperature and satisfactorily inert with respect to the molten and solidified metal. Fibers of fused quartz also may be substituted for the aluminum silicate fibers of these examples of compositions found satisfactory for employment with aluminum if at the same time these same substitutions are made for the talc provided the tendency of the fused quartz fibers to soften at the pouring temperature of the copper or brass is not deemed objectionable in respect to the quality of the metal strip produced.

With metals having pouring temperatures materially above that of copper, compositions according to the examples found satisfactory for use with aluminum may be employed if magnesium silicate is employed for the material of the fibers and if in respect to the loading material the same substitutions are made for the talc as when the metal is copper or brass. However, as hereinbefore mentioned, quartz fibers may be employed with these metals having a materially higher pouring temperature than copper and brass if the tendency of the quartz fibers to soften at such higher temperature is not deemed objectionable in respect to the use to which the resulting metal strip is to be put and if the same substitutions are made for the talc.

The billet containing the improved pulverizable elongated members may be rolled to produce the metal strip by use of ordinary mill equipment and in accordance with usual mill practice in respect to the particular metal of which the billet is formed. Such rolling operation will ordinarily comprise hot rolling the billet followed by cold rolling it, the metal when necessary being annealed between cold rolling passes. The strip produced may be of any desired thickness within the limitations imposed by the equipment being used and the pressures and equipment available for subsequent inflation of the slits. By employing thick billets of long length the strip produced may be quite long, sometimes a mile or more if the strip is of quite small gauge. Ordinarily, but without limitation thereto, the billet will be from 3 to 8 inches thick and from 3 to 12 feet long, the permissible thickness and length depending upon the mill facilities available for casting and rolling the billet.

The pulverizable elongated members are preferably of rectangular cross-section because with such cross-section the slits produced in the rolled strip are found to have sharply defined straight edges, and further, by employing members of such cross-section to produce slits of a given width, the amount of weld preventing powder produced by crushing the members can be readily regulated by varying their thicknesses. When employing the elongated members of circular cross-section it has been found that when their diameters exceed more than about ¼ inch the powder produced by the crushing of such members tends to be pushed away from the edges of the slits being formed causing opposite faces of the slits at their edge portions to weld together at points along the lengths of the slits, thus producing slits having irregular and ragged edges. Furthermore, with the members of circular cross-section for producing slits of a given width, the amount of weld preventing powder formed by the crushing of the members cannot be regulated. Preferably the thicknesses of the members of rectangular cross-section are such as to cause said members when crushed to a powder to produce substantially no more powder in respect to the lengths of the slits than is necessary to form the slits.

In the drawings:

FIGS. 18 to 29 show various forms of elongated members according to the invention, FIG. 22 being a section on the line 22—22 of FIG. 21, FIG. 23 a section on the line 23—23 of FIG. 24, FIG. 27 a section on the line 27—27 of FIG. 26, and FIG. 29 a section on the line 29—29 of FIG. 28;

FIG. 30 is a more or less schematic view showing an instrumentality for use in producing the elongated member according to FIG. 25;

FIG. 31 illustrates a way of installing the elongated member according to FIG. 25 in the mold according to FIGS. 4, 9, 10 and 11;

FIGS. 33, 34, 35, 36 and 37 are sections on the lines 33—33, 34—34, 35—35, 36—36 and 37—37, respectively, of FIG. 32;

FIG. 8 is a fragmentary elevation, with parts in section, of a continuous casting apparatus of the so-called D.C. type according to the invention for casting a billet containing rigid or semi-rigid elongated members;

FIGS. 39, 40 and 41 are sections on the lines 39—39,
40—40 and 41—41, respectively, of FIG. 38, with parts omitted and parts in elevation; and FIG. 42 is an isometric view of one of the sections of the elongated members according to FIGS. 38 to 41.

Figures 1, 2, 3, 6, 8:
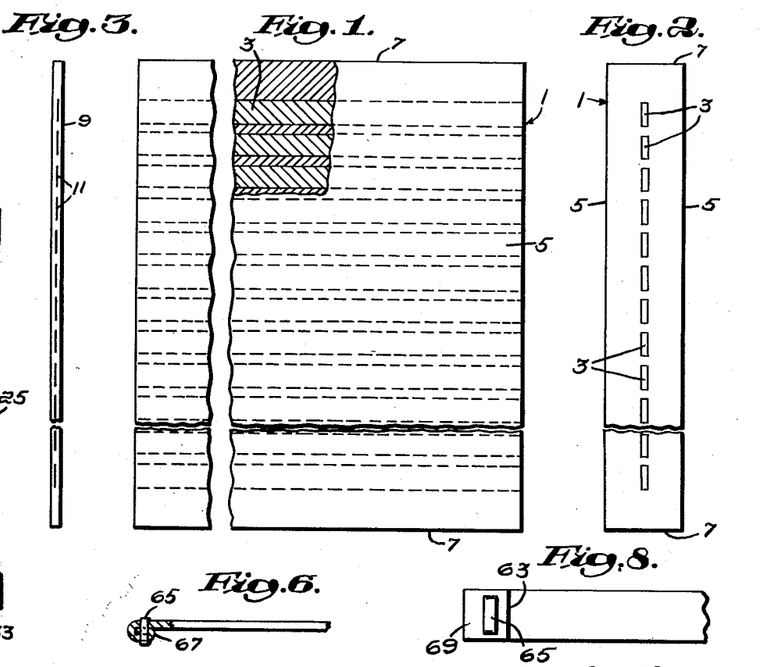
FIG. 1 is a side elevation, with parts in section, of a billet according to the invention.
FIG. 2 is an end elevation of the billet according to FIG. 1.
FIG. 3 is an end view of a strip according to the invention produced by rolling the billet according to FIGS. 1 and 2.
FIG. 6 is an edge view, with parts in section, of a modified form of the lower end portion of one of the elongated members employed in the mold according to FIG. 4.
FIG. 8 is a plan view of the lower end portion of the elongated member according to FIG. 7.

As shown by FIGS. 1 and 2, the billet 1 may consist of a slab-like body of metal cast about a row of the pulverizable elongated members 3, which latter, as shown in these figures, are of rectangular cross-section and are parallel to the opposite faces 5 and edges 7 of the billet. This billet may be rolled to produce a stip of any desired thickness, for example, the thin strip 9 being shown by FIG. 3, the slits formed in the strip being indicated at 11.

Figure 4:
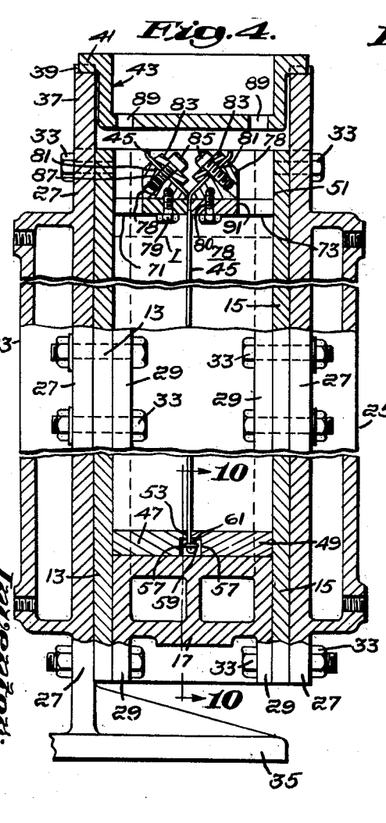
FIG. 4 is an elevation of a mold for producing the billet according to FIGS. 1 and 2, with parts broken away and parts in section.

The billet according to FIGS. 1 and 2 may be cast in the mold according to FIGS. 4, 9, 10 and 11. This mold comprises the opposite face plates 13 and 15 between which at their edge portions are inserted the water jacketed member 17 forming the bottom of the open-top mold chamber 18, and the water jacketed members 19 forming the sides of that chamber. As shown, the face plates 13 and 15 are backed by the water jacketed members 23 and 25, respectively. These members 23 and 25 are each shown as provided with the peripheral flanges 27, and the members 17 and 19 with the peripheral flanges 29 and 31, respectively. Through aligned perforations in these flanges and those portions of the face plates 13 and 15 which lie between the flanges extend bolts 33 for removably holding the parts together. The member 23 at the left of the mold, as viewed in FIG. 4, is shown as provided with feet 35 that may rest upon and be bolted to a suitable support (not shown). By removing the bolts 33 securing the member 25 and face plate 15 to the rest of the mold the mold chamber may be opened for removal of the billet after the latter is cast. As illustrated, the uppermost flanges 27 of the members 23 and 25 are provided with upwardly extending portions 37 formed on their upper edges with notches 39 which removably receive the outer projecting lugs 41 of a removable pouring box 43.

Figure 11:
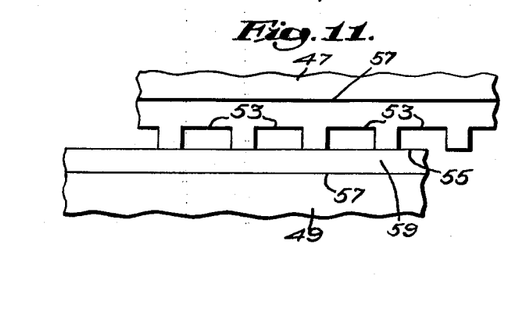
FIG. 11 is a fragmentary section on the line 11—11 of FIG 10, with parts omitted.

As illustrated, the above described mold is arranged for reception of a row of the flexible pulverizable elongated members 45, such members being held under longitudinal tension for keeping them straight. As shown, resting upon the top of the bottom member 17 of the mold are a pair of plates 47 and 49, these plates at their end edges being removably and slidably received by grooves 51 (FIGS. 9 and 10) formed in the edge members 19 of the mold. The longitudinally extending edges of these plates adjacent the center of the mold abut each other as indicated in FIGS. 4 and 11, the edge of the plate 47 being formed with a longitudinally extending row of spaced notches 53 of the same cross-section as the flexible elongated members, which notches are closed by the adjacent edge 55 of the plate 49. Beneath the notches 53 the adjacent portion of each plate is provided with a longitudinally extending groove 57 (FIGS. 4 and 11) to provide a recess 59 (FIGS. 4 and 10) beneath the openings formed by the closed notches.

Figure 5:
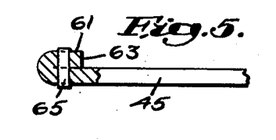
FIG. 5 is an edge view, with parts in section, of the lower end portion of one of the pulverizable elongated members employed in the mold according to FIG. 4.
Figure 7:
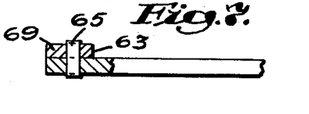
FIG. 7 is an edge view, with parts in section, of a further modified form of the lower end portion of one of the elongated members employed in the mold according to FIG. 4.

The elongated members about which the metal is cast extend through the above closed notches 53 which act accurately to space them. For holding the members in the notches when the members are placed under longitudinal tension, and for keeping them from floating upward by reason of their buoyancy in the molten metal poured into the mold, each may be provided at its lower end with a suitable "stopper." This stopper may be formed by folding over the end of the member, as indicated at 61 (FIG. 5) to provide a shoulder 63, the folded over portion being secured to the body of the member by a suitable staple 65 of heat refractory metal. Where the member is relatively thin it may be folded over several times, as indicated at 67, (FIG. 6). Where the member is relatively stiff, or is otherwise of such character that it cannot be folded without fracture, a separate piece cut from the member may be stapled or otherwise secured to its lower end portion, as indicated at 69 (FIGS. 7 and 8) to provide the shoulder 63.

Figure 9:
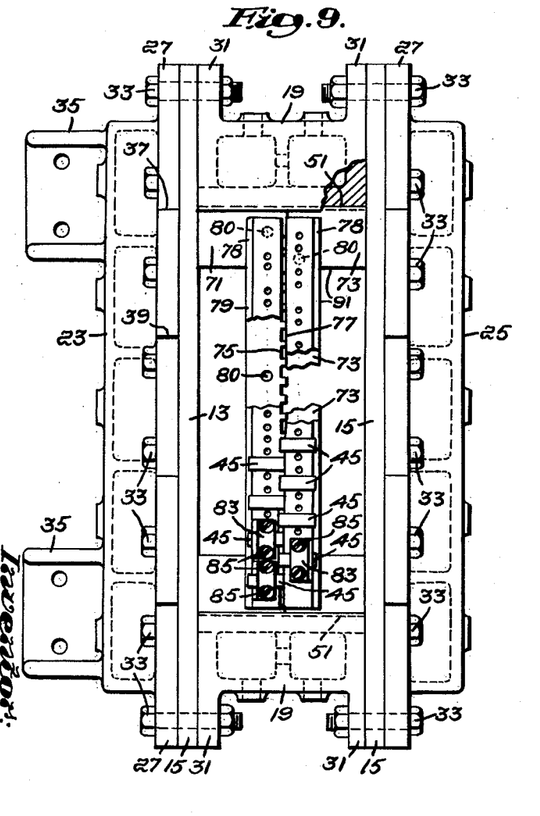
FIG. 9 is a plan view of the mold according to FIG. 4 with the pouring box removed.
Figure 10:
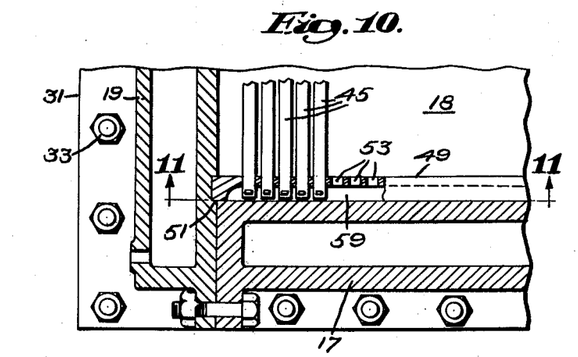
FIG. 10 is a fragmentary section on the line 10—10 of FIG. 4.

At the upper portion of the mold the edge members 19 thereof are shown as provided with further grooves 51 which slidably and removably receive the edge portions of plates 71 and 73. These plates at their edges adjacent the center of the mold abut each other as indicated in FIG. 9, the edge of the plate 71, like the corresponding edge of the plate 47 at the bottom of the mold, being formed with notches 75 vertically aligned with the notches 53 of the plate 47, these notches 75 being closed by the adjacent edge 77 of the plate 73. As shown in FIGS. 4 and 9, each plate 71 and 73 carries at its upper side a bar 78 extending longitudinally thereof and secured thereto by tap bolts 79 extending through perforations 80 therein. Each bar, as shown, is provided with an upwardly extending surface 81 (FIG. 4), these surfaces on the two bars flaring away from each other as they extend upward. The surface 81 of the bar on the plate 73 forms an upward prolongation of the surface of the adjacent edge 77 of that plate, while the surface 81 of the bar on the plate 71 forms an upward prolongation of the bottom surfaces of the notches 75 in the plate 71.

As illustrated, associated with each of the bars 78 is a row of short length plates 83 each for clamping to the bar the upper end portion of the flexible member 45 resting on the surface 81 of the bar. For clamping each plate 83 against its associated flexible member are provided a pair of screws 85 lying at opposite sides, respectively, of that member and having shanks 87 tapped into the bar.

In assembling the flexible members with the mold above described the pouring box 43 may be removed, and the face plate 15 and its associated backing member 25 removed from the rest of the mold, in the way hereinbefore indicated. The plates 47 and 71 may then be slid in place. The flexible members, having the hereinbefore described stoppers at their lower ends, may then be entered into the notches 53 of the plate 47 and into the notches 75 of the plate 71, whereupon the plates 49 and 73 cooperating with the plates 47 and 71, respectively, may be slid in place to close these notches, and the mold then be closed by replacing the face plate 15 and its backing member 25 and bolting them in position. The plates 83 may then be placed over the flexible members and be secured to the bars 78 by the screws 85 without clamping those members tightly against the bars. The upper end of each flexible member may then be separately grasped by the hand of the operator and pulled upward to place the member under requisite tension, the upper end of the member being left long enough for that purpose, and, while holding the member under such tension, the screws 85 of the associated clamping plate 83 may be tightened to clamp the member securely against the surface 81 of the bar. After the flexible members are clamped to the bars under tension their projecting ends may be trimmed off and the pouring box replaced, whereupon the mold may be poured by entering molten metal into the pouring box, this metal flowing through a row of openings 89 in the bottom of the pouring box in streams which pass through elongated openings 91 in the plates 71 and 73, which latter openings, as indicated in FIG. 9, may be formed by cutting away limited portions of those plates which lie adjacent their outer edges intermediate their ends. The mold may be poured to a level indicated by the line L (FIG. 4) and the metal permitted to solidify, after which the portions of the flexible members between the top of the billet and the plates 71 and 73 may be severed and the mold again opened and the billet removed therefrom, the plate 49 sliding from the mold with the billet.

In the above described mold the reason for having the flexible members alternately clamped to different ones of the two bars 78 is because of the close spacing of the members. In cases where the flexible members are spaced sufficiently far enough apart to permit it, but one bar 78 need be provided and all the members be attached to that bar. Having the surfaces 81 of the bars inclined to the faces of the mold permits ready access to the screws 85 when the mold is closed and before the pouring box is placed on top of the mold.

In cases where the elongated members about which the billet is cast are sufficiently rigid not to require them to be placed under longitudinal tension their upper end portions may merely slidably project through the openings formed by the notches 75 and the plate 73.

Figures 12, 13, 15, 16:
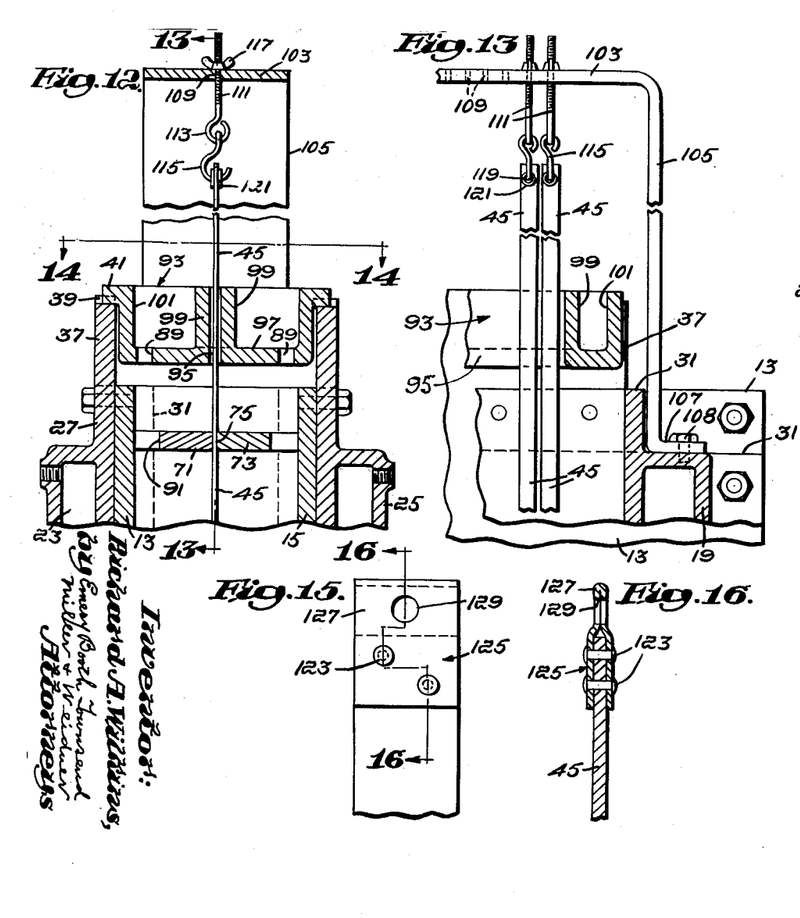
FIG. 12 is a fragmentary view of the upper portion of a modified form of the mold according to FIGS. 4, 9, 10 and 11.
FIG. 13 is a section on the line 13—13 of FIG. 12, with parts in elevation.
FIG. 15 is a side elevation of the upper portion of a modified form of one of the elongated members according to FIGS. 12 and 13.
FIG. 16 is a section on the line 16—16 of FIG. 15.
Figure 14:
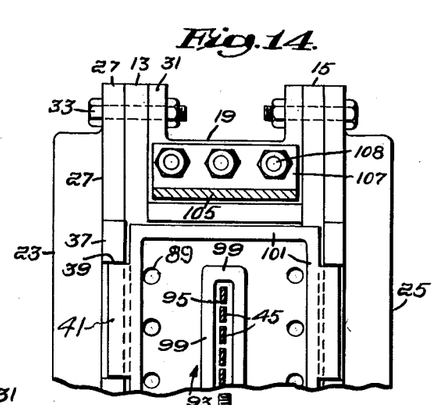
FIG. 14 is a fragmentary section on the line 14—14 of FIG. 12.

In the modification of the invention shown by FIGS. 12, 13 and 14 means are provided for both placing the flexible members 45 under tension and holding them in that condition. In this modification the bars 78 are omitted, the flexible members extending vertically upward and slidably through the notches 75 to above the pouring box 93. To permit this the pouring box is provided with an elongated slot-like opening 95 in its bottom wall 97 and, at the edges of said opening, with a continuous upstanding wall 99 of the same height as the side walls 101 of the pouring box. In this way is formed a ring-like pouring box through the central opening of which the flexible members extend. This pouring box, like the one heretofore described, is shown as provided adjacent its upper edges with the outwardly projecting lugs 41 removably received in the notches 39 of the upstanding portions 37 of the flanges 27 at the top of the mold.

As shown in FIGS. 12 to 14, above the mold illustrated is provided a cross-bar 103 to which the flexible members are secured. This cross-bar is supported at opposite sides of the mold by vertical bars 105 integral with the ends of the cross-bar, the bars 105 at their lower ends being shaped to form feet 107 which rest upon and are secured by bolts 108 to the tops of the edge members 19 of the mold. As shown, the cross-bar is provided with a row of perforations 109 through which extend the screw-threaded shanks of eye-bolts 111, the eyes 113 of these bolts lying below the bar and loosely carrying hooks 115. Above the bar the shanks of the bolts carry thumb-nuts or other nuts 117 resting upon the top of the bar. As shown, the upper end portions of the flexible members are provided with perforations 119 so that those members may be hooked onto the hooks 115. As shown, these perforations are provided with metal grommets 121 which however may be omitted in cases where the material of the flexible members is tough enough not to need them. When the flexible member is of a rather tender structure there may be secured to its upper end by means of clamping rivets 123 (FIGS. 15 and 16) a thin metal folded plate 125 provided with an upwardly projecting portion 127 formed with a perforation 129 for receiving the hook on the end of the eye-bolt. By means of the thumb-nuts 117 the upper ends of the flexible members may be drawn upward to place them under longitudinal tension, and after they are so tensioned they will be held under tension.

Figure 17:
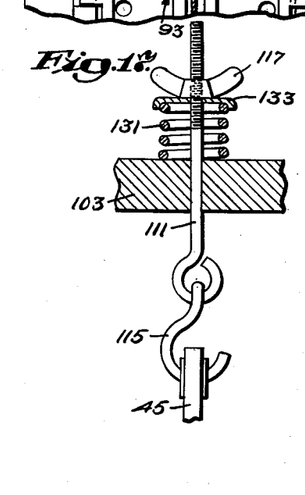
FIG. 17 shows a modified form of one of the instrumentalities, according to FIGS. 12 and 13, for applying tension to the elongated members.

In the modification shown in by FIG. 17 the shank of each eye-bolt 111 may extend through a coiled compression spring 131 which at its lower end rests on the upper side of the cross-bar 103. As shown, positioned on the top of the spring is an inverted cup-shaped washer 133, against the upper side of which latter bears the thumb-nut or other nut 117. By tightening the thumb-nuts the flexible members will be placed under tension and the springs will be compressed yieldingly to hold the members under such tension. This arrangement may be employed when the flexible members are rather long and of such structure that they tend to stretch when placed under tension.

In FIGS. 18 to 29 are indicated various forms of elongated members, according to the invention, about which the metal may be cast to form the billet.

Figures 18, 19, 20, 20A, 21, 22, 23, 24, 25, 26, 27, 30, 31:
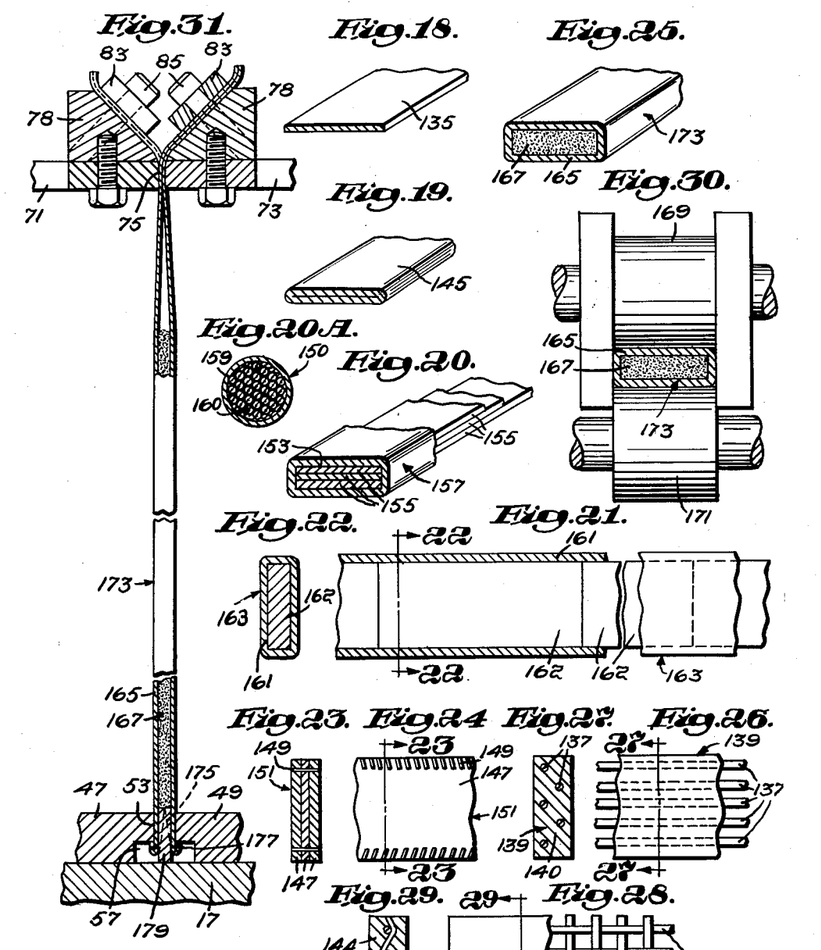

As shown in FIG. 18, the elongated member may be in the form of a flat strip 135. This strip may be braided or woven of yarns, threads, or other strands formed of the fibers to form a tape of textile material, or may be slit from a textile sheet woven of such strands. Also the strip may be slit from a sheet of any of the paper products hereinbefore mentioned. When the strip is formed of braided or woven textile material its thickness ordinarily will not exceed about 1/32 inch. When it is of cardboard, and particularly when it is of pressedboard, it may have any desired thickness as hereinbefore explained. The strip when of textile material ordinarily will be quite flexible. When formed of the paper product it may be flexible, semi-flexible, or quite stiff, depending upon the amount of loading material in such product.

The sheets from which the paper strips constituting the elongated members are slit may be reinforced with longitudinally extending yarns or other strands 137 (FIGS. 26 and 27) formed of the fibers, from which sheets may be slit the elongated members 139. These sheets may be formed at the paper mill in a known manner to cause the reinforcing strands to be embedded in the mass 140 of paper formed of the fibers.

Similarly the sheet, from which the elongated members 141 (FIGS. 28 and 29) are slit, may be reinforced by an open-mesh screen-like web 143 formed of strands of the fibers. This web may be made in a known manner, and at the paper mill be embedded in a known manner in the mass 144 of fibers constituting the paper.

When a thicker textile strip is desired the strands formed of the fibers may be braided to form a tube constituting the elongated member 145 (FIG. 19). Such tube as it leaves the braiding machine will be flat, as shown in FIG. 19, and will be maintained flat when installed in the mold and subjected to longitudinal tension.

Thicker strips may be formed of the paper and textile material by superimposing two or more strips 147 (FIGS. 23 and 24), and the superimposed strips be secured together at their edges by a row of stitches, indicated at 149, to produce the flexible elongated member 151.

Also thicker strips may be formed by braiding a tubelike covering 153 (FIG. 20) about one or more superimposed textile strips 155, or strips of any of the paper products, to produce the elongated member 157.

A cord-like flexible elongated member 158 (FIG. 20A) of circular cross-section may be formed in a known manner by braiding a covering 159 of strands of the fibers tightly about a group of yarns 160 of the fibers.

Thicker strips may also be produced by inserting in a tube-like covering 161 (FIGS. 21 and 22), braided of strands made from the fibers, short endwise abutting pieces 162 of solid rod, of material such as soapstone, graphite, or any of the hereinbefore mentioned molded materials, to produce the elongated members 163. By having these pieces of short length a flexible elongated member will be produced. Instead of having the solid materail in the form of endwise abutting pieces that material may be inserted as a continuous length of the same, it making no difference if the solid material should break because the pieces thereof would be held together by the tube-like covering 161.

Likewise the elongated member may be made by partially filling a tube 165 (FIG. 25), braided of strands made of the fiber, with powdered material 167 such as talc, powdered mica, magnesia, alumina, graphite, or the like, and the tube so filled passed between a set of power driven sizing rolls 169 and 171 (FIG. 30) to produce the elongated member 173, the rolls compacting the powdered material and sizing the member.

When graphite is employed for the material enclosed by the braided fiber covering of FIGS. 21 and 25 those coverings will keep such material out of contact with the molten metal, and out of contact with the solidified metal when heated to the hot rolling temperature, to prevent the graphite from dissolving into ferrous and nickeliferous metals when either of such metals is employed.

The cord-like elongated member according to FIG. 20A may be installed in the mold hereinbefore described by tying a knot in the end of such member to form the stopper, and, if the modifications of the mold shown by FIGS. 12 and 17 are utilized, by tying a loop in the upper end of the member for securing that end to the hook 115. With such cord-like members the openings formed by the pairs of plates 47, 49 and 71, 73 of the mold, through which openings those members pass, will of course be made circular in cross-section, which obviously may be done by forming spaced mating semi-circular grooves in the abutting edges of the plates of each pair.

The elongated member 173 according to FIG. 25 may be installed in the mold according to FIGS. 4 and 9 to 11 in the way indicated in FIG. 31. Each of the opposite edge portions of the tubular covering 165 of the member at its lower end may be slit a short distance back of that end as indicated at 175, and each face of the covering be folded over and the fold stapled to form stoppers 177 each similar to that hereinbefore described in connection with FIG. 5. In the lower end of the covering may be inserted a short length 179 of solid material, such as soapstone, graphite, or the like, to prevent the end of the covering so slit from collapsing when the lower end of the member is received in the closed notch 53 and the member placed under longitudinal tension. The filling material may be removed from the covering for a short distance back of its upper end and the covering at that end be collapsed to flatten it so that it may be received in one of the closed notches 75 formed at the abutting edges of the plates 71 and 73, after which the member may be placed under longitudinal tension by pulling upward on such collapsed end and, while such end is being so pulled, clamping it to one of the bars 79 in the way hereinbefore described. Placing the covering material under longitudinal tension will act to bind it tightly against the mass of filling material and thus maintain the cross-sectional shape of such filling.

The elongated members 157 of FIG. 20 and the elongated members 163 of FIGS. 21 and 22 may be installed in the mold in the same way as that just described in connection with the elongated members 173, except that in the case of the members 157 and 163 the short lengths 179 of solid material inserted in the lower end of the tubular covering will not be needed. With the members 157 and 163 the holding of their coverings under longitudinal tension also will act to bind such coverings tightly about the material enclosed by them.

In FIGS. 32 to 37 is shown a form of the hereinbefore mentioned continuous casting apparatus of the D.C. type for use in casting the billet having pulverizable elongated members of sufficient flexibility to require them to be placed under longitudinal tension to hold them straight during the casting operation. Apparatus of this type is well known, and hence will not be described with any more particularity than necessary to explain the present invention.

Figure 32:
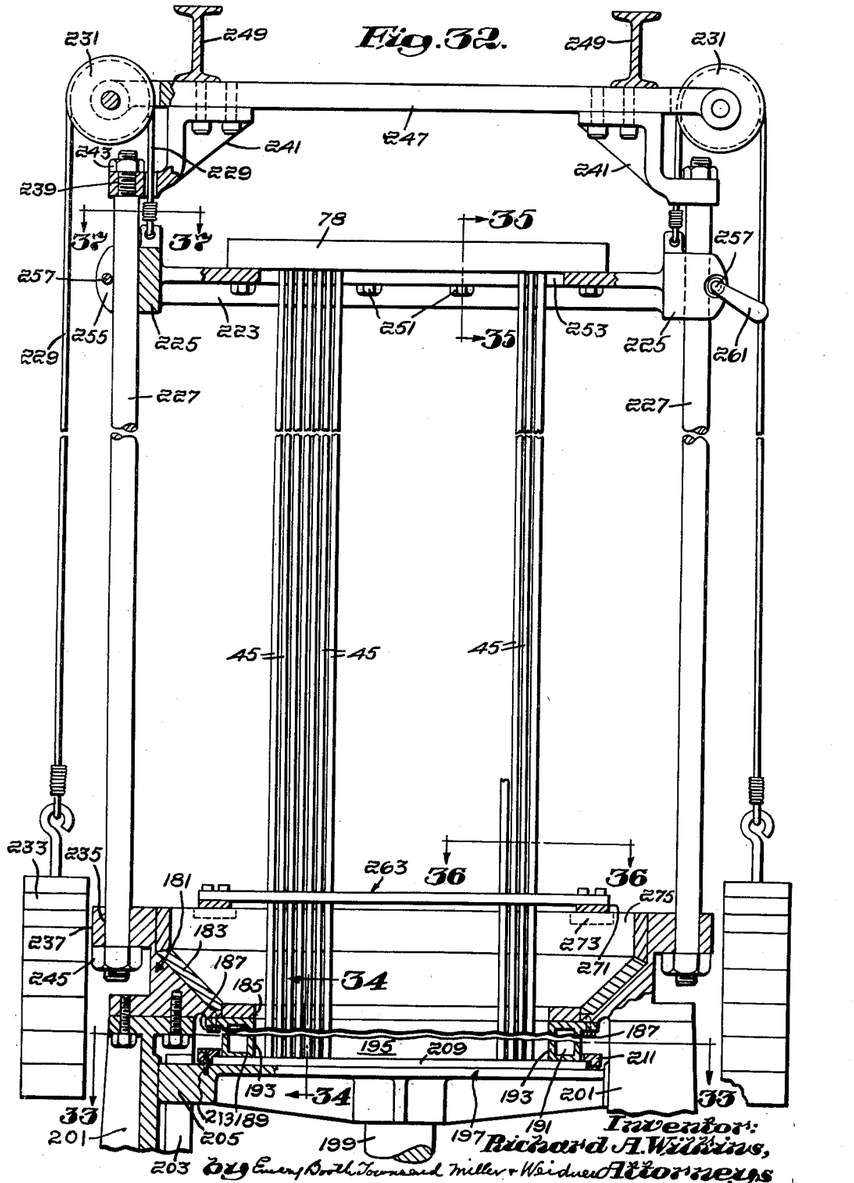
FIG. 32 is an elevation, with parts broken away and parts in section, of a continuous casting apparatus of the so-called D.C. type for casting a billet containing flexible elongated members according to the invention.

As shown, the just mentioned apparatus comprises an open-top "runner box" or receptacle 181 provided with an inner refractory lining 183 and a bottom opening 185. Secured to the under side of the runner box by bolts 187 is a so-called "chilled ring" 189 which is formed of heat conducting metal and comprises a water jacket 191 for keeping its inner wall 193 cool. The continuous wall 193 defines an open-ended casting chamber 195 of the cross-sectional shape and size of the billet to be cast. At its upper end this chamber communicates with the bottom opening 185 of the runner box so that metal poured into that box through its open top will flow into such chamber and there be solidified. Normally after the operation of the apparatus is initiated the molten metal will be maintained in the runner box at a level several inches above the top of the ring. At its lower end the casting chamber is closed at the start of the operation by a platform or platen 197 shown as resting against the lower side of the chilled ring. This platform is shown as carried by the upper end portion of a reciprocatory piston rod 199 of a hydraulic ram (not shown). The lower end of the billet formed by the solidification of molten metal within the chilled ring rests on this platform. To initiate the operation of casting the billet the platform is maintained stationary until sufficient metal solidifies to plug the lower end of the chilled ring. After this, by operating the ram in a known manner to cause the platform slowly to descend, and at the same time pouring molten metal into the runner box, the billet will be progressively formed. The vertical height of the ring is such as to accommodate the casting operation to the temperature and latent heat of freezing of the particular molten metal being cast and the temperature of the cooling water available for supplying the jacket of the ring, the cross-section of the billet, and the speed at which the billet is to be formed. This height therefore may vary considerably, but commonly will be somewhere about 8 inches.

As shown, the runner box is supported on vertically extending standards 201. These standards are shown as provided at their inner sides with grooves 203 against the walls of which slidably contact projections 205 extending from opposite ends of the platform for steadying the latter in its descent. After a billet of desired length is formed pouring of the metal into the runner box is discontinued and the platform lowered sufficiently to cause the upper end of the billet to move out of the ring while the billet is supported in a known way against tilting, whereupon the billet may be removed from the platform also in a known way.

Figures 32, 33:
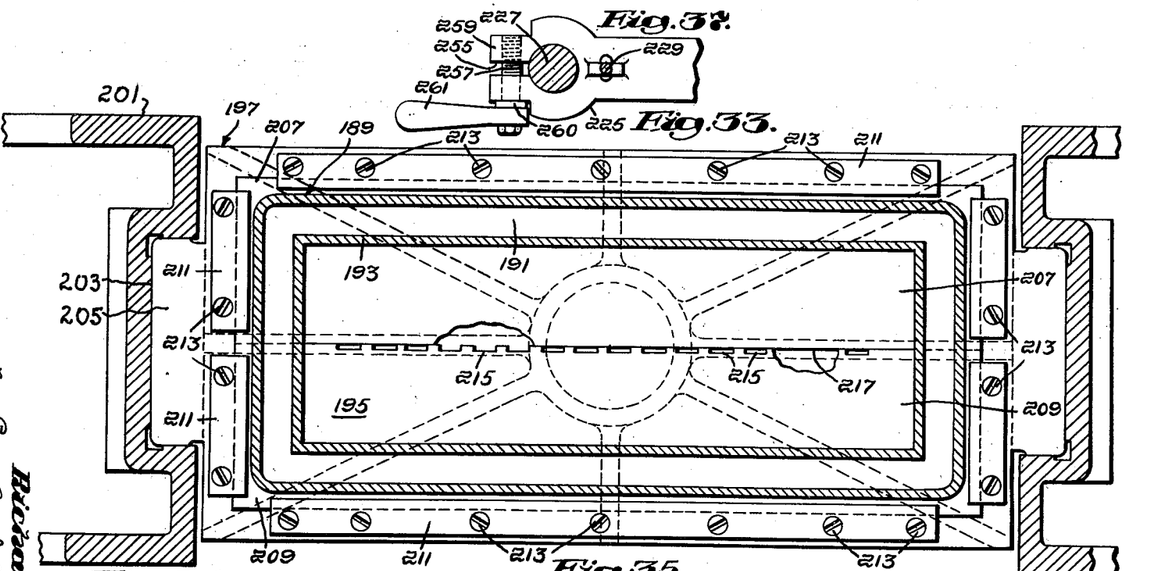

As shown, the platform 197 at its upper side comprises a pair of plates 207 and 209 (FIGS. 32, 33 and 34) resting upon the underlying part of the platform and clamped thereto by clamping strips 211, which latter are removably attached to said underlying part by clamping screws 213. As best shown in FIG. 33, the plate 209 is formed at its edge intermediate the width of the chilled ring 189 with a series of spaced notches 215 which are closed by the adjacent edge 217 of the plate 207. Adjacent these edges each of these plates is formed at its under side with a longitudinally extending groove 219 (FIG. 34), which grooves together form a recess 221. Extending through the closed notches 215 into this recess are the lower ends of the flexible members 45, the portions of such members within the recess being folded and stapled to form the stoppers 61 as heretofore explained in connection with FIG. 5.

At their upper ends the flexible members 45 of FIG. 32 are secured to a vertically movable, horizontally positioned bar 223 having the perforated end portions 225 (FIGS. 32 and 37), through which perforations extend the stationary, vertically positioned guide rods 227 for the bar. Secured to this bar adjacent the guide rods are flexible cables 229 which pass over pulleys 231 and then downward to their lower ends where they carry weights 233. The weights and cables normally urge the bar upward to hold the flexible members under longitudinal tension.

As indicated in FIG. 32, the guide rods 227 at their lower ends pass through perforations 235 formed in lugs 237 integral with and projecting laterally from the end walls of the runner box 181. At their upper ends the rods extend through perforations 239 formed in stationary brackets 241. The portions of the rods extending through the perforations of these brackets are of reduced diameter, and at the upper sides of the adjacent portions of the brackets carry removable nuts 243 for normally fixedly securing the upper ends of the rods to the brackets. At their lower ends the rods carry nuts 245 bearing against the under sides of the projecting lugs 237. By tightening the nuts 245 after the upper ends of the rods are fixedly secured to the brackets 241 the rods are kept under sufficient longitudinal tension to insure that they are kept straight. As shown, the brackets 241 are bolted to the under side of a horizontal bar 247 which may be secured in any convenient way to a stationary overhead support, herein exemplified by the I-beams 249, say by welding it to the lower flanges of said I-beams. At its opposite ends the bar 247 rotatably carries the pulleys 231.

Figures 34, 35:
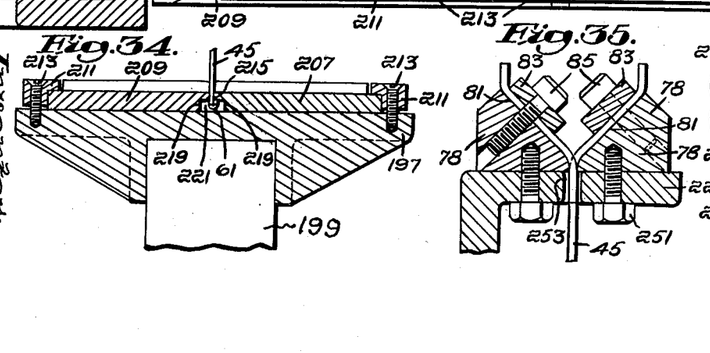

For securing the flexible members 45 to the bar 223 the bar is shown as carrying at its upper side a pair of the bars 78 hereinbefore described, said bars as before being provided with the clamping plates 83 and clamping screws 85, and being secured to the bar 223 by bolts 251 (FIGS. 32 and 35). As indicated in FIG. 35, the bar 223 is formed with a longitudinally extending slot 253 through which the flexible members extend to the bars 78. If desired, instead of securing the upper ends of the flexible members to the bar 223 in this way, they may be secured to it by providing it with the eye-bolts, hooks and thumb-nuts of FIGS. 12 to 14 or with the eye-bolts, hooks, springs, washers and thumb-nuts of FIG. 17, arranged with the bar in the same way that they are arranged with the horizontal cross-bars of those figures, the flexible members having perforations adjacent their upper ends for attaching them to the hooks as shown in those figures.

As shown in FIGS. 32 and 37, each perforated end portion 225 of the bar 223, through which perforations the guide rods 227 extend, is split as indicated at 255, and through the split portion transversely thereof passes a screw 257 tapped into the upper part 259 of such portion as viewed in FIG. 37. At its lower projecting end the screw is formed with a collar 260 resting against the adjacent side of the split portion, and, below said collar, carries the handle 261 for turning the screw. By so turning the screws to clamp the split portions of the bar against the guide rods the bar may be held against upward and downward movements during the operation of securing the flexible members to it, each of these members while the bar is so held being initially placed under tension by the operator manually pulling on its upper end and holding it under such tension until it is clamped to the bar 78 by means of the associated clamping plate and screws. When all the flexible members are so secured the handles 261 may be turned to release the bar 223 from the guide rods and permit that bar to move downward as the platform 197 of the apparatus descends.

Figure 36:
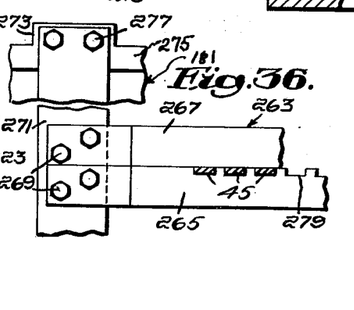

Adjacent the top of the runner box 181 is positioned a guide 263 for the flexible members. As best shown in FIGS. 32 and 36, this guide comprises a pair of bars 265 and 267 removably bolted at opposite end portions, as indicated at 269, to cross-bars 271. At their opposite ends these cross-bars rest upon lugs 273 projecting from the outer sides of the upper edge portions of the adjacent side walls 275 of the runner box, and are removably bolted to said lugs as indicated at 277. As best illustrated in FIG. 36, the bar 265 at its edge adjacent the bar 267 is formed with notches 279 which are closed by the bar 267 to form guide openings through which the flexible members slidably pass, these guide openings being in alignment with the openings formed by the plates 207 and 209 forming part of the movable platform 197 of the apparatus. In this way the guide 263 serves to hold the flexible members in proper spaced relation as they pass into the chilled ring.

At the completion of the casting operation the portions of the flexible members projecting from the upper end of the billet may be severed. Also the clamping strips 211 for the plate 207, with which plate the stoppers at the lower ends of the flexible members cooperate, may be detached from the underlying portion of the platform 197 by removal of the screws 213 associated with those strips, whereupon the billet together with the plate 209, more or less attached thereto by the projecting ends and stoppers of the flexible members, may be slid off or otherwise removed from the platform and after it is so removed the plate will detach itself from the billet.

FIGS. 38 to 42 illustrate a modification of the hereinbefore described continuous casting apparatus of the D.C. type for forming the billet having stiff pulverizable elongated members about which the billet is cast, for example, those formed of the pressed-board hereinbefore described.

Figures 38, 39, 40, 41, 42:
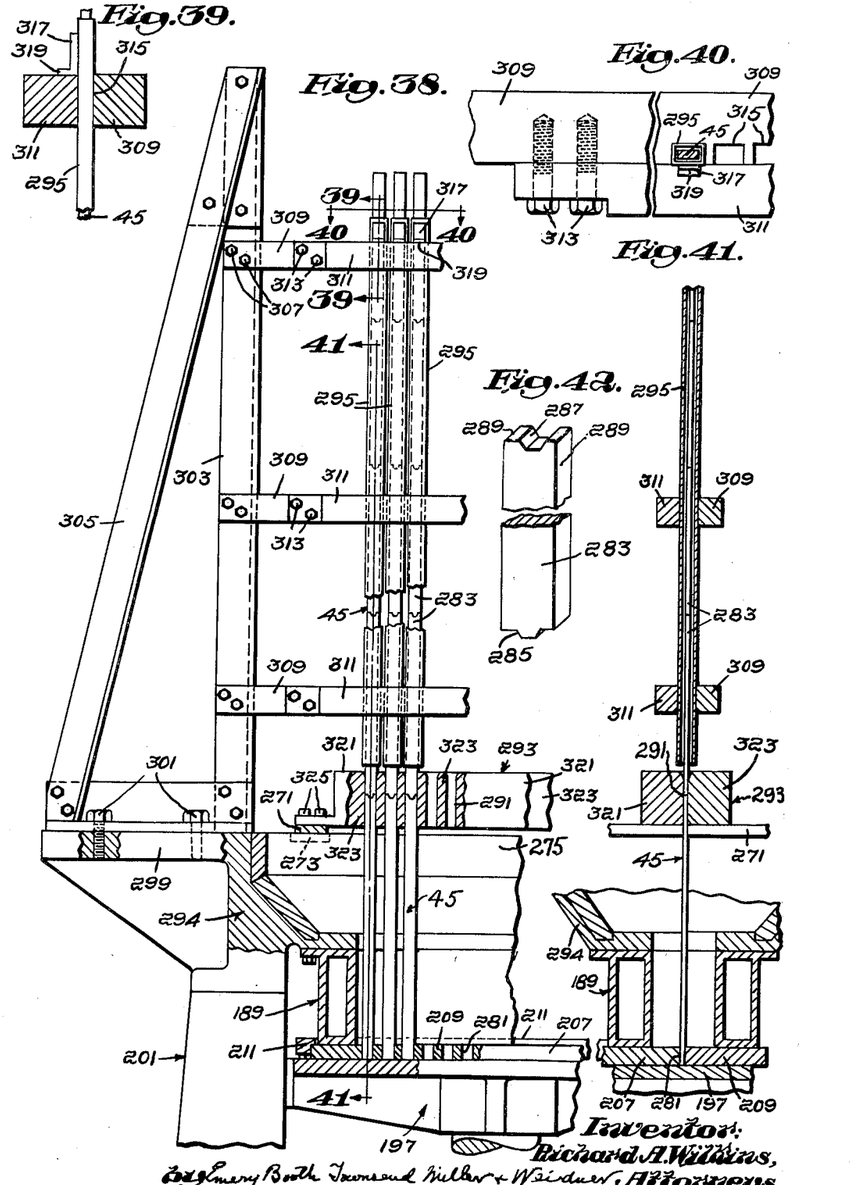

In the modification just mentioned the plate 269 resting upon and clamped to the underlying portion of the descendable platform 197 is formed, at its edge intermediate the width of the chilled ring, to provide a row of spaced notches 281, in which notches the lower end portions of the elongated members are inserted and their ends permitted to rest upon said underlying portion of the platform. No stoppers ordinarily need be provided on such ends of the members because they are not placed under tension and do not extend through a sufficient depth of molten metal to cause their buoyancy in such metal to float them upward.

FIGS. 38 and 41 show the elongated members as formed of longitudinally extending, endwise abutting sections 283. These sections may have plain square ends, or preferably, as best shown in FIG. 42, their ends may be formed with complementary tenons 285 and notches 287 so that the tenon at the lower end of one section fits into the notch at the upper end of the section which it abuts. The notches and tenons hold the opposite edges 289 of abutting sections exactly in alignment. In this connection it will be noted that, if the opposite faces of two abutting section of the member are slightly out of alignment, the resulting out of alignment of the faces of the space in the billet occupied by those sections will be so reduced when the billet is rolled that such out of alignment of those faces will be negligible in the strip produced, which would not be the case if the edges of the space were out of alignment.

The elongated members extend through guide passages 291 formed in the guide 293 positioned above and close to the top of the runner box 294, which passages are aligned with the openings formed by the closed notches 281 in the plate 269 so that the portions of the members entering the chilled ring 189 will be accurately held in vertical position and in properly spaced relation.

The lengths of the sections of each elongated member are such that while the section extending into the chilled ring is still within its associated guide passage 291 its lower portion will be frozen into the solidified metal, so as to insure that that section is held against lateral movement when its upper end leaves the guide passage and thus form a rigid support for the lower end of the next succeeding section fed through the passage. The guide passages 291 are of sufficient length to insure that the sections within them and projecting from their lower ends will be held in proper alignment with the sections immediately below them.

As illustrated, the sections of the elongated members are positioned within the bores of vertically extending, normally stationary tubular members 295 positioned above the guide 293, which members form a magazine for such sections. The bores of these tubular members are in vertical alignment with the guide passages 291, the lower ends of the tubular members preferably being positioned close to the guide so that the sections descending through the tubular members will properly enter the guide passages. The bores of the tubular members shown are of cross-sectional shape similar to that of the elongated members. Preferably the elongated members fit such bores somewhat loosely so as to leave a slight clearance between them and the walls of the bores to insure that the members may descend by gravity through the bores without binding.

The tubular members may be of such lengths as to accommodate all the sections necessary to form the elongated members to be incorporated into the billet being cast, or they may be of shorter lengths and additional sections of the elongated members be inserted by hand through their open upper ends from time to time as the platform 197 slowly descends. In fact, and particularly when the molten metal being cast is of relatively low temperature, such as aluminum, it is quite feasible to omit the tubular members and feed the sections by hand one by one through the passages in the guide 293, each succeeding section being fed when the upper end of the preceding section fed is above the level of the molten metal in the runner box 294. It is feasible in all these cases to have all the sections, except the lowermost resting against the platform, quite short, successful results having been secured with sections about 8 inches long when the parts are so proportioned to accommodate and feed them in the ways mentioned.

It will be understood that instead of employing sectional elongated members in the apparatus according to FIGS. 39 to 41 there may be employed elongated members in continuous lengths and long enough to extend through the billet from end to end thereof. Members of stiff pressed-board when of long length and in the form of strips, although capable of supporting their own weight when positioned vertically, nevertheless tend to bow laterally, and by placing them within the tubular members such bowing is prevented.

It will also be understood that the apparatus according to FIGS. 39 to 41 is adaptable for use with sectional elongated members formed of material other than the fibrous material hereinbefore described, for example, sectional members formed of soapstone cut from soapstone slabs as received from the quarry, soapstone being particularly adaptable for use with aluminum and aluminum-base alloys. The apparatus is also adaptable for use when employing rigid elongated members in continuous lengths of brittle material such as graphite, the insertion of such brittle members in the tubular members acting to insure that lateral strains will not be accidentally put on such brittle members and cause them to fracture.

For supporting the tubular members the runner box 294 at each of opposite ends thereof is shown as provided with a bracket 299 on which rests and to which is removably secured by bolts 301 the vertical standard comprising the angle-irons 303 and 305. Removably secured to the angle-irons 303 at opposite ends of the runner box by bolts 307 are the end portions of two or more horizontally positioned, vertically spaced cross-bars 309. Resting against a vertical side of each of these bars is a horizontally positioned bar 311 removably secured thereto at its end portions by bolts 313. As best shown by FIG. 40, that vertical side of the cross-bar 309 which is adjacent the bar 311 is formed with spaced notches 315 which are closed by the bar 311 to form openings which receive the tubular members. As indicated by FIGS. 39 and 40, brazed to each tubular member is the vertical leg 317 of an angle-shaped member, the horizontal leg 319 of which rests on the upper side of the uppermost bar 311 to prevent the tubular members from sliding downward through the openings formed by the closed notches 315 and to permit them to be withdrawn vertically through said notches for replacement.

The guide 293 is formed in the same manner as the guide 263 hereinbefore described in connection with FIGS. 32 and 36, being formed of bars 321 and 323 the end portions of which are removably secured by bolts 325 to the cross-bars 271, the bar 323, like the bar 265 of FIG. 36, being formed on a vertical side thereof with spaced notches closed by the adjacent vertical side of the bar 321 so as to form the guide passages 291 of FIG. 38, the guide passages 291 having the same cross-sectional shape as the passages formed by the closed notches 279 of FIG. 36.

It will be understood that the metal cast about all the elongated members hereinbefore described will when it shrinks upon solidification tightly engage such members so that they become, in effect, an integral part of the billet and cannot be removed therefrom, except in some instances, and then only by a most laborious and expensive drilling and broaching operation which becomes almost an impossibility with the fibrous elongated members.

It also will be understood that, as explained in my above mentioned copending application Serial Number 518,768, the rows of pulverizable elongated members need not necessarily be positioned in the widthwise medial plane of the billet, but may be positioned closer to one face of the billet than to the other so that the slits formed in the strip will lie correspondingly closer to one face of the strip than to its opposite face, and that in this way the slits may be positioned close enough to a face of the strip that when pressure fluid is introduced into the slits only the metal which is between the slits and such face will be forced away from the planes of the slits to expand the latter. Also it will be understood that, as likewise explained in said copending application, the billet may have more than one row of the pulverizable elongated members so that the strip will have a corresponding number of rows of slits.

It will be further understood that within the scope of the appended claims wide deviations may be made from the forms of the invention herein described without departing from the spirit of the invention.

I claim:

1. The process of making material of the character described, having one or more longitudinally extending slits parallel to its opposite faces, by an operation comprising forming a billet in which the metal is cast about pulverizable elongated members, one for each slit to be formed in the material, and, without removing said members, hot rolling the billet, followed by cold rolling it, for decreasing its thickness and, in the directions of the lengths of said members, elongating it, and for moving opposite sides of the spaces occupied by said members toward each other to form said slits, and for crushing said members to weld preventing powder and extending such powder along said spaces and slits as the billet is being so elongated, which process is characterized by employing, for the elongated members, bodies formed at least to a substantial extent of fibers of fused vitreous material compatible with the metal being cast at the pouring temperature of that metal and when said metal has solidified and being sufficiently fine to be flexible per se and pulverizable to fine weld preventing powder by such rolling of the billet, and in which process the bodies constituting the elongated members are flexible, said process being further characterized by vertically parallelly positioning said members and subjecting them to and holding them under longitudinal tension while casting the billet-forming metal about them and thereby to keep them straight and in spaced parallelism.

2. The process according to claim 1 in which the material of the fibers is selected from the group consisting of heat refractory glass, fused quartz, and fused aluminum silicate.

3. The process according to claim 1 in which the bodies constituting the elongated members are in the form of flexible textile strips.

4. The process according to claim 1 in which the bodies constituting the elongated members are in the form of flexible strips comprising the fibers matted or felted together.

5. The process according to claim 1 in which the bodies constituting the elongated members are in the form of pressed-boardlike strips comprising the mineral fibers matter or felted together and also loading material affording semi-rigid stiffness to said strips.

6. The process according to claim 1 in which the bodies constituting the elongated members are in the form of flexible strips, comprising the fibers matted or felted together, having reinforcing strands made of the fibers extending at least longitudinally thereof.

7. The process according to claim 1 in which the fibers of the bodies constituting the elongated members are in the form of superimposed flexible strips made of the fibers and stitched together at their edges with threads made of the fibers for holding such strips in assembled relation.

8. The process according to claim 1 in which the bodies constituting the elongated members are in the form of superimposed strips, made of the fibers, and are sheathed with a tube-like covering of textile material made of strands of the fibers.

9. The process according to claim 1 in which the bodies constituting the elongated members are in the form of textile tubes, made of strands of the fibers, stuffed with a filling of the fibers.

10. The process of making material of the character described which comprises forming a billet of hot and cold rollable metal by casting such metal about one or more elongated members having outer tube-like textile coverings formed of strands, made of fibers of fused vitreous material sufficiently fine to be flexible per se, capable of being crushed to fine weld preventing powder when the billet containing said members is subjected to a rolling operation, which tube-like coverings enclose fillings of fine weld preventing powder; hot rolling the billet, followed by cold rolling it, for decreasing its thickness and, in the directions of the lengths of said members, elongating it, and for moving opposite sides of the spaces occupied by said members toward each other to form slits extending longitudinally of the billet, and for crushing said coverings to fine weld preventing powder, and for extending that powder and the powder constituting said fillings along said spaces and slits as the billet is being elongated.

11. The process of making metal strip of the character described which comprises forming a billet of hot and cold rollable metal by casting such metal about one or more elongated members having outer tube-like textile coverings formed of strands, made of fibers of fused vitreous material sufficiently fine to be flexible per se, capable of being crushed to fine weld preventing powder when the billet containing said members is subjected to a rolling operation, which tube-like coverings enclose fillings of material in massive form also capable of being crushed to fine weld preventing powder when the billet containing said members is subjected to the hot rolling operation; rolling the billet, followed by cold rolling it, for decreasing its thickness and, in the directions of the lengths of said members, elongating it, and for moving opposite sides of the spaces occupied by said members toward each other to form slits extending longitudinally of the billet, and for so crushing said tube-like members and fillings to such powders, and for spreading said powders along said spaces and slits as the billet is being elongated.

12. The process of making metal strip of the character described which comprises forming a billet of hot and cold rollable metal by utilization of continuous casting apparatus having a chilled ring for receiving and solidifying molten metal discharged into it and a descendable support on which the solidified metal rests to cause the billet to be progressively cast as the support descends, and effecting such continuous casting about pulverizable elongated members, one for each slit to be formed in the ultimate strip, and, without removing said members, hot rolling the billet followed by cold rolling it, for decreasing its thickness and, in the directions of the lengths of said members, elongating it, and for moving opposite sides of the spaces occupied by said members toward each other to form said slits, and for crushing said members to weld preventing powder and extending such powder along said spaces and slits as the billet is being so elongated, in which process there is employed, for the elongated members, bodies formed at least to a substantial extent of fibers of fused vitreous material compatible with the metal being cast at the pouring temperature of that metal and when said metal has solidified and being sufficiently fine to be flexible per se and pulverizable to fine weld preventing powder by such rolling of the billet, and in which process the bodies constituting such elongated members are flexible, said process being further characterized by vertically parallelly positioning said members and subjecting them to and holding them under longitudinal tension while continuously casting the billet-forming metal about them and thereby to keep them straight and in spaced parallelism.

References Cited in the file of this patent

UNITED STATES PATENTS

| | | |
|---|---|---|
| 29,276 | Holmes | Sept. 8, 1860 |
| 377,316 | Marshall | Jan. 31, 1888 |
| 377,318 | Marshall | Jan. 31, 1888 |
| 1,005,628 | Fisher | Oct. 10, 1911 |
| 1,039,673 | Schatz | Sept. 24, 1912 |
| 1,463,015 | Guay | July 24, 1923 |
| 2,212,481 | Sendzimir | Aug. 20, 1940 |
| 2,241,283 | Wackerle | May 6, 1941 |
| 2,330,371 | Miller | Sept. 28, 1943 |
| 2,483,056 | Leckie | Sept. 27, 1949 |
| 2,628,417 | Peyches | Feb. 17, 1953 |
| 2,740,188 | Simmons | Apr. 3, 1956 |
| 2,811,773 | Baskin | Nov. 5, 1957 |
| 2,824,348 | Williams | Feb. 25, 1958 |

FOREIGN PATENTS

| | | |
|---|---|---|
| 401,476 | Germany | Sept. 8, 1924 |